United States Patent [19]

Mote

[11] 4,357,841
[45] Nov. 9, 1982

[54] AUTOMATIC GRINDING ATTACHMENT FOR SAW GRINDERS

[76] Inventor: Terry A. Mote, 8417 Little Rd., Bloomington, Minn. 55437

[21] Appl. No.: 150,738

[22] Filed: May 19, 1980

[51] Int. Cl.³ .......................................... B23D 63/12
[52] U.S. Cl. ........................................ 76/41; 76/77; 76/78 A
[58] Field of Search .................. 76/37, 41, 75–77, 76/79, 78 A, 78 R; 51/216 ND, 34 D

[56] References Cited

U.S. PATENT DOCUMENTS

| | | | |
|---|---|---|---|
| 2,588,263 | 3/1952 | Matthewman | 76/41 |
| 3,691,874 | 9/1972 | Miller | 76/41 |
| 4,018,109 | 4/1977 | Stier | 76/77 |
| 4,111,075 | 9/1978 | Varley | 76/41 |

Primary Examiner—Roscoe V. Parker
Attorney, Agent, or Firm—Paul L. Sjoquist

[57] ABSTRACT

Apparatus for converting a manually operated machine for grinding saw blades into automatic operation; including a first hydraulic cylinder for connection to the grinding wheel carriage assembly for reciprocation thereof, a second hydraulic cylinder for connection to a saw blade for incremental rotation thereof, and an electromechanical control circuit for sequencing the operation of the cylinders to automatically position and grind each of a plurality of teeth on a saw blade.

24 Claims, 5 Drawing Figures

AUTOMATIC GRINDING ATTACHMENT FOR SAW GRINDERS

BACKGROUND OF THE INVENTION

This invention relates to grinding machines for industrial and commercial purposes, and more specifically to improvements in an attachment to grinding machines for converting such machines from manual operation to automatic operation. Grinding machines for industrial and commercial applications are widely used and have been especially designed for specific applications in many instances. For example, grinding machines for sharpening circular saw blades are in common usage, wherein such machines include a mounting fixture for holding a circular saw blade and a manually movable grinding wheel for contacting various edges of the saw to grind these edges to a uniform and sharpened condition. The present invention is an improvement in such machines whereby a manually operated grinding machine for sharpening circular saws may be converted into an automatic machine.

Circular saws may be characterized by a number of different parameters, including diameter, number and type of teeth, metal composition, cutting edge shape and bevel, and intended usage. Circular saws also have a number of characteristics in common; included among these characteristics are the desirability of maintaining uniformity in size and shape of the saw teeth, or patterns of teeth, and the desirability that all such teeth have uniformly sharpened cutting edges. Since it is inevitable that all circular saws will become dulled with usage, it is important that equipment which is designed for sharpening such blades be capable of maintaining the uniformity of shape, size and cutting edge which is required.

Carbide tipped saw blades have been in usage for a number of years, and these blades offer the advantage of providing extended use without having their cutting edges become dulled as rapidly as ordinary steel saw blades. Such blades are constructed of steel, but have small carbide tips attached on each of the teeth along the steel cutting face. The carbide tips are formed from extremely hard carbide steel material which wears away and dulls very slowly. When such a blade does become dull it usually requires superior equipment having diamond grinding wheels for adequately sharpening the carbide tips. The preferred embodiment of the present invention relates to an improvement in carbide saw grinders whereby such grinders may be converted from manual operation to automatic operation. Such a manual carbide saw grinder may be found in a machine manufactured by Foley Manufacturing Company, Minneapolis, Minn., as Model 357, and other similar model designations. The preferred embodiment of the present invention is disclosed with reference to attachment to the foregoing machine, recognizing that adaptations may be made to the invention for permitting its attachment to other similar manually operated saw grinders.

In general, there are three grinding operations that can be performed to sharpen a carbide tipped saw blade. These three operations are face grinding, top grinding and side grinding. Face grinding is the sharpening of the carbide tip face of each sawtooth which engages the material to be cut. Top grinding involves sharpening of the outer edge portions of each of the saw teeth around the blade circumference, and is usually intended to provide uniformity of tooth height to maintain perfect roundness of the saw blade. Side grinding refers to a grinding operation performed on the flat sides of the blade, and specifically on the carbide tip edges which are parallel to the blade flat surface. Top grinding and face grinding require independent and precision grinding operations for each tooth on the saw blade. In any grinding operation entailing the sharpening of carbide tipped saw blades, it is usually necessary to only grind a few thousandths of an inch in order to restore the sharpness of the saw teeth. Therefore the grinding equipment must be capable of precision and repeatable operation to within tolerances of better than a few thousandths of an inch.

SUMMARY OF THE INVENTION

The present invention provides a linear travel, power actuated means for attachment to manually movable elements of a saw grinding machine, and control actuators for sequencing the power actuated devices in a preferred and selectable cycle to enable a saw grinder to automatically proceed through a grinding operation on all saw teeth of a particular saw blade. The invention includes sensing switches for detecting limits of travel of the power actuated devices for terminating each operational step and initiating a subsequent operational step, and a counting mechanism for monitoring all of the sequential operations to discontinue the sharpening procedure when all of the teeth on the saw blade have been sharpened. The invention is usable in face grinding operations as well as in top grinding operations.

It is principal object of the present invention to provide an improvement in saw grinders comprising an attachment to manually operated saw grinders for converting same to automatic operation.

It is a further object and advantage of the present invention to provide precision indexing for saw blades during grinding operations for consistent and repeatable sharpening.

It is yet another object and advantage of the present invention to provide an automatic saw grinder attachment usable in both the face grinding and top grinding operations.

It is still another object of the present invention to provide an automatic grinding apparatus which sequences through predetermined steps to uniformly sharpen all of the teeth on a saw blade and to automatically shut off at the completion of the operation.

It is still a further object of the present invention to provide an automatic saw grinding apparatus which provides grinding operations to saw teeth at predetermined tooth space spacings.

BRIEF DESCRIPTION OF THE DRAWINGS

The foregoing objects and advantages, as well as other and additional objects and advantages will become apparent from the following detailed description of a preferred embodiment of the invention, and with reference to the attached drawings, in which.

DESCRIPTION OF THE PREFERRED EMBODIMENT

Figure 1:
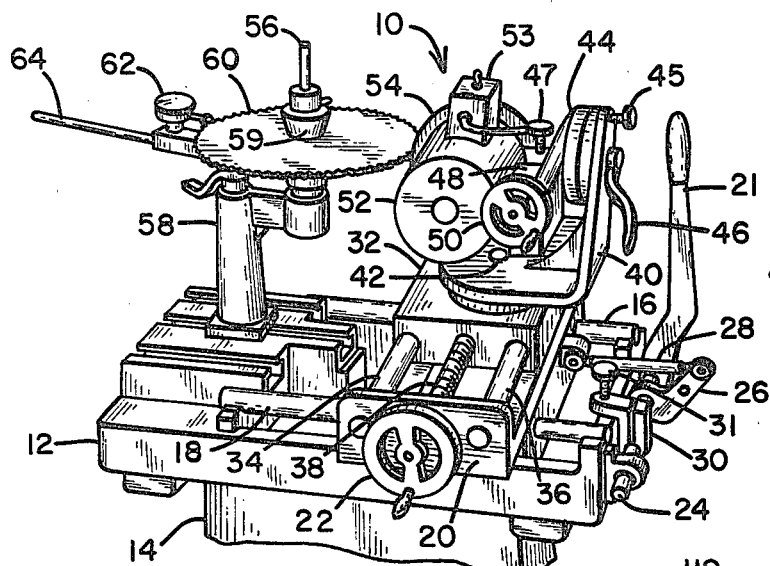
FIG. 1 illustrates in isometric view a prior art manual saw grinding machine.

Referring first to FIG. 1, there is shown a partial isometric view of a typical manually operated carbide saw grinder. Reference will be made herein to the Model 357 Carbide Saw Grinder manufactured by Foley Manufacturing Company, Minneapolis, Minn., as representing a typical machine for which the present invention may be adapted for attachment. Grinding machine 10 has a bed 12 which is solidly attached to a pedestal 14. A pair of parallel smooth shafts 16 and 18 are attached to bed 12 at a slightly elevated horizontal position and a movable carriage assembly 20 is mounted on shaft 16 and 18 by means of linear ball bearings. Carriage assembly 20 may be slidably moved over shafts 16 and 18 by means of handle 21. Handle 21 is clamped to shaft 24, as is bracket 26, so that movement of handle 21 about the axis of shaft 24 causes similar movement of bracket 26 about the same axis. A rod 28 is pivotally connected to bracket 26 and carriage assembly 20 to transform the motion of bracket 26 into linear movement of carriage assembly 20 over shaft 16 and 18. A stop adjustment 30 may be selectively clamped to shaft 24 to limit the travel of carriage assembly 20, and thereby set the depth of the grinding operation on a saw blade as will be hereinafter described.

A saddle 32 is slidably mounted on saddle traverse rods 34 and 36. Saddle 32 is positionable along traverse rods 34 and 36 by means of screw 38 which is attached to hand wheel 22, and is threadably engaged in saddle 32.

A motor support angle 40 is pivotally attached to saddle 32 by means of a vertical pivot stud 42. Motor support angle 40 may be thereby adjusted about the vertical axis of pivot stud 42, sliding on the top surface of saddle 32.

A quadrant 44 is secured to motor support angle 40 by means of a locking handle 46. A motor mount 48 is slidably engaged with quadrant 44, and may be moved inwardly and outwardly by means of motor traverse handwheel 50. Motor 52 is attached to motor mount 48 and is movable therewith. A grinding wheel 54 is attached to the shaft of motor 52. Quadrant 44 may be pivotally moved about its mounting stud, and a locking pin 45 enables the adjustment of quadrant 44 at 0°, or a horizontal position. A lockscrew 47 may be threadably adjusted to limit or restrict the travel of motor mount 48 within quadrant 44. An electrical switch 53 controls the electrical drive voltage to motor 52.

A top and face grinding attachment 58 is slidably attached to bed 12. A centering stud 56 projects vertically therefrom, passing through the center hole of saw blade 60. A cone 59 is axially fitted over centering stud 56 and wedged into the center hole of saw blade 60, thereby centering saw blade 60 about centering stud 56. A dial indicator 62 is attachable to top and face grinding attachment 58 by means of an indicator rod 64. Dial indicator 62 is slidable along rod 64, and is typically used to measure the outer circumferential saw teeth projections to ensure roundness of saw blade 60.

All of the foregoing machine parts and components form a part of the Model 357 saw grinding machine hereinbefore described, and may be described in more detail in Service Manual No. R001 100, published by Foley Manufacturing Company, Minneapolis, Minn. Other and further attachments to this saw grinding machine are available from the manufacturer, but are not necessarily pertinent to an understanding of the present invention. For convenient reference herein reference numerals from 1-100 will be used to designate those elements which represent prior art components, and reference numerals from 101-200 will be used to designate elements of the invention herein.

Figure 2:
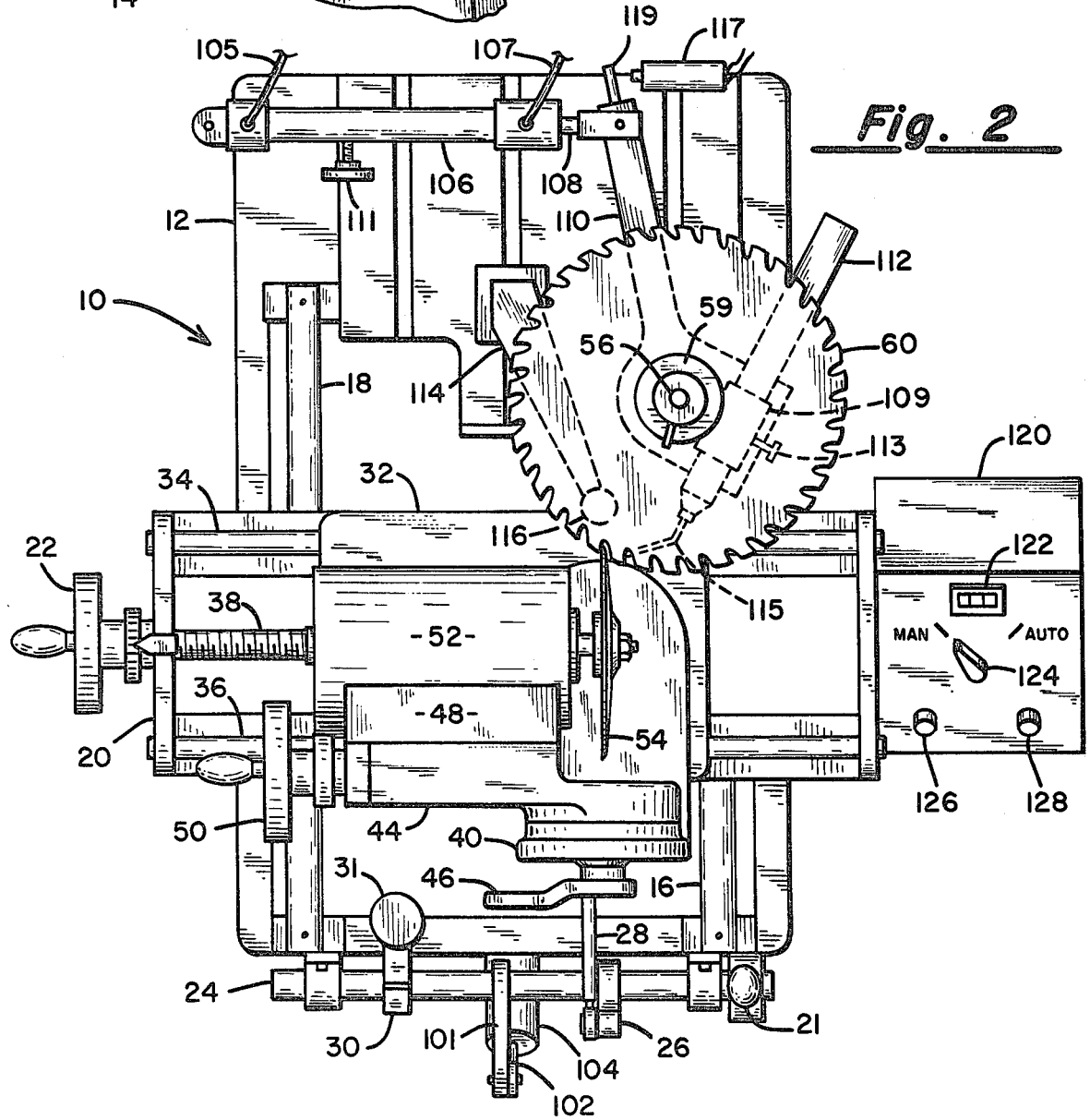
FIG. 2 shows a top view of the invention attached to a manual saw grinding machine.

Referring next to FIG. 2, there is shown a top view of the machine of FIG. 1 having the invention attached thereto. A bracket 101 is clamped to shaft 24 in a fixed but adjustable position. Hydraulic cylinder rod 102 is pivotally attached to bracket 101, and rod 102 is extensible and retractable from cylinder 104 by hydraulic pressure applied to cylinder 104. The other end of cylinder 104 is attached to pedestal 14.

Hydraulic cylinder 106 is attached to pedestal 58, and has an extensible and retractable rod 108 activated by hydraulic pressure applied via lines 105 and 107. Rod 108 is pivotally connected to one end of arm 110. The other end of arm 110 is pivotally attached around top and face grinding attachment 58. A sleeve 109 on arm 110 encloses an indexing arm 112. Indexing arm 112 may be positioned axially within sleeve 109 by means of lockscrew 113, and sleeve 109 may be pivotally positioned about centering stud 56 by a locking screw (not shown). An index finger 115 extends from one end of indexing arm 112, and is positionable to contact a tooth face on saw blade 60.

A stabilizing arm 114 is attached to bed 12 and projects upwardly toward the undersurface of saw blade 60. An electromagnet 116 is attached to the end of stabilizing arm 114, and extends upward to just contact the undersurface of saw blade 60. Electromagnet 116 may be energized by means of wires (not shown) to cause a magnetic holding force against saw blade 60 to hold it in a stabilized position.

A control housing 120 is attached to the side of bed 12. Control housing 120 contains the electrical and electromechanical controls for proper sequencing and operation of the invention. A counter 122 displays a number corresponding to the number of grinding operations which have taken place when the system is in automatic mode. A selector switch 124 permits operation of the system in either a manual mode or an automatic mode. Switch 128 permits manual extension of cylinder rod 102; switch 126 permits manual retraction of cylinder rod 102. The detailed operation of the switches and circuit controls of the invention will be described with reference to the diagram of FIG. 5.

Figure 3:
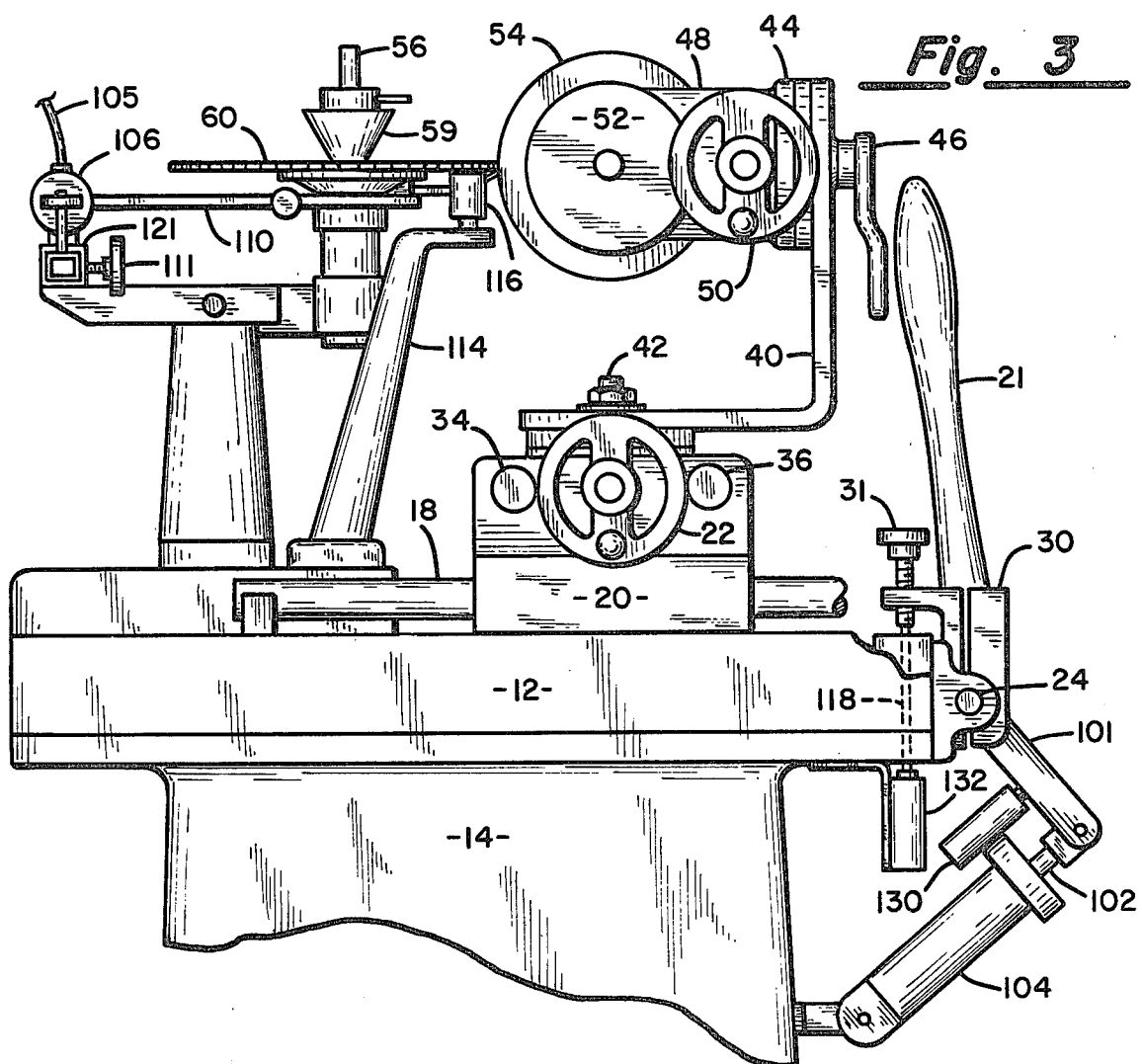
FIG. 3 shows an elevation view of the invention.

FIG. 3 shows a side view of the grinding apparatus with the invention attached. The activation of cylinder 104 is controlled by either of two limit switches. Limit switch 130 becomes actuated by bracket 101 when cylinder rod 102 is retracted a predetermined distance into cylinder 104. Limit switch 132 becomes actuated by a pin 118 which is slidably inserted in a hole through bed 12. Stop adjustment screw 31 is set to contact pin 118 at a predetermined angular position of shaft 24. This contact forces pin 118 downward to depress the actuator for limit switch 132.

Figure 4:
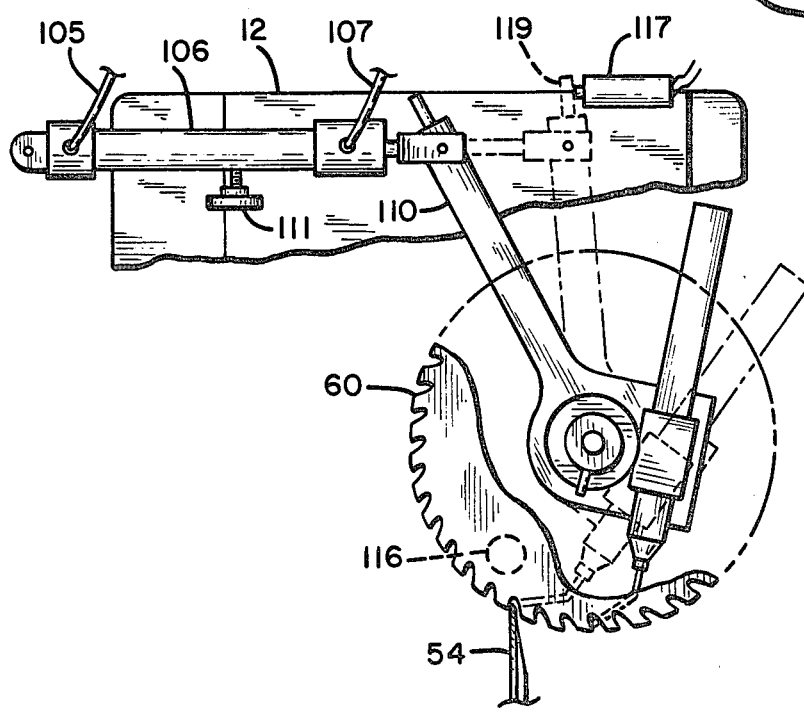
FIG. 4 illustrates a top view of a portion of the invention.

A similar limit switch arrangement controls the operation of hydraulic cylinder 106. A limit switch 117 is actuated by a lever 119 projecting from the end of arm 110, to control the maximum extension of rod 108. It should be noted that the position of cylinder 106 can be selectively adjusted by lockscrew 111 which tightens against the cylinder holder within tube 121. FIG. 4 shows the operation of cylinder 106 in its extended and retracted position. In the extended position lever 119 actuates limit switch 117 to generate a signal which causes the hydraulic pressure forces within cylinder 106 to reverse, thereby retracting rod 108.

Figure 5:
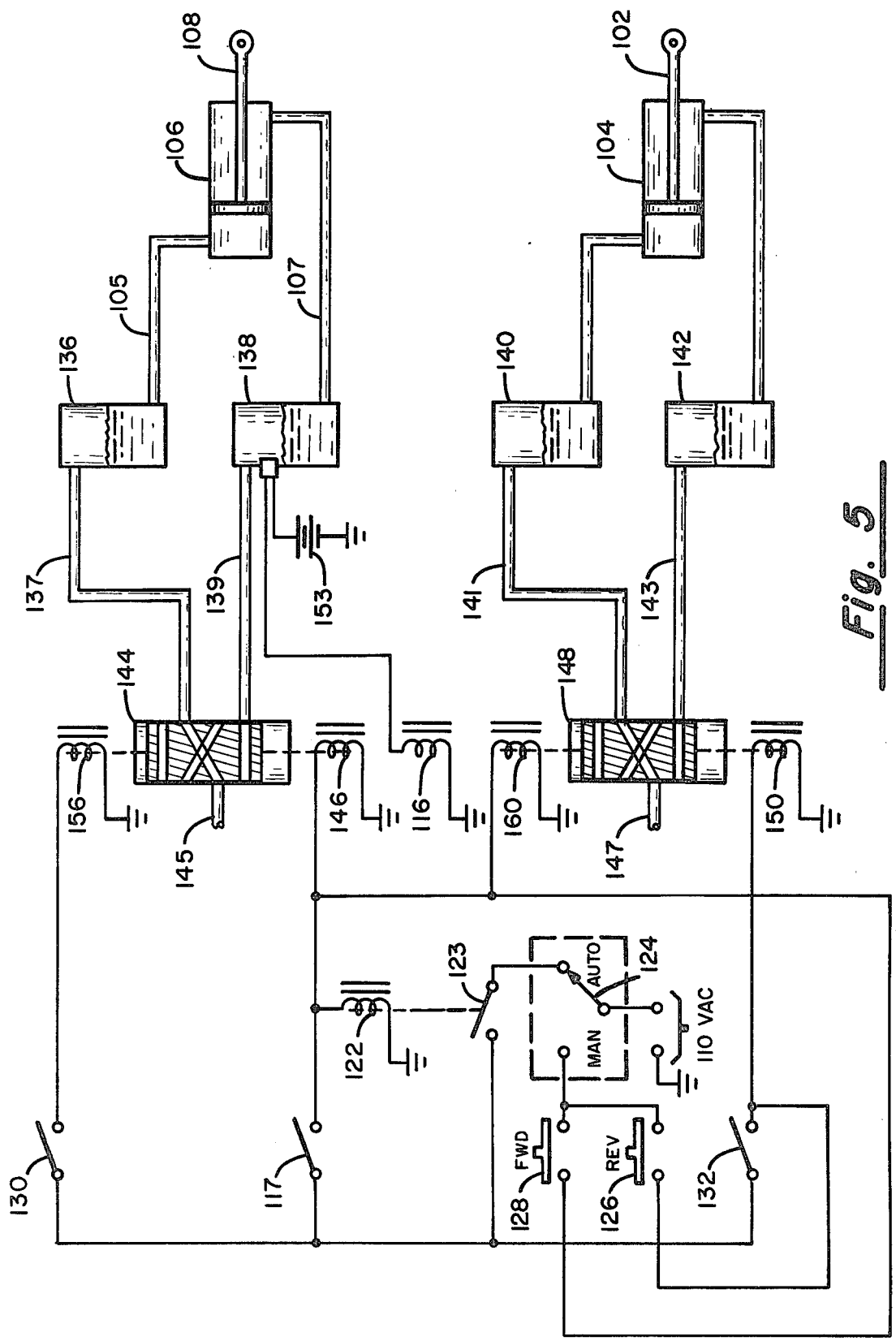
FIG. 5 is a symbolic schematic diagram of the control features of the invention.

FIG. 5 shows a schematic and symbolic diagram of the control mechanism for the invention. Cylinders 104 and 106 are shown symbolically, with their respective rods 102 and 108. Rod 108 is extended upon application of pressurized hydraulic oil from air/oil tank 136, and rod 108 is retracted within cylinder 106 by application of pressurized hydraulic oil from air/oil tank 138. Similarly, rod 102 is extended from cylinder 104 by application of pressurized hydraulic oil from air/oil tank 140, and rod 102 is retracted by application of pressurized hydraulic oil from air/oil tank 142. Air/oil tank 136 receives air through an inlet connected to air line 137, and the other air/oil tanks respectively receive air through an inlet coupled to air lines 139, 141, 143. The air pressure admitted into the respective air lines is either at atmospheric pressure or at an elevated pressure in the range of 50–100 pounds per square inch (p.s.i.). Solenoid valve 144 has a pressurized air inlet 145. Valve 144 is a two-position spool valve controlled by electric solenoids 146 and 156, which toggle valve 144 in either of two positions. In a first valve position pressurized air on line 145 is coupled to line 137, and line 139 is relieved to atmospheric air pressure. In a second position of valve 144, pressurized air on line 145 is coupled to line 139, and line 137 is relieved to atmospheric air pressure. Air line 147 is connected as an inlet to solenoid valve 148. Valve 148 is also a two-position spool valve selectively controlled by solenoids 150 and 160, either in a first position which couples line 147 to line 141, and line 143 to atmospheric pressure; or in a second position which couples line 147 to line 143, and line 141 to atmospheric pressure. In all cases, the application of pressurized air to lines 137, 139, 141, or 143 develops an air pressure in the respective air/oil tank, and forces pressurized hydraulic oil into cylinder 106 or 104. Valves 144 and 148 are preferably air solenoid valves, such a Type No. AADSA 400C, manufactured by Numatics, Inc., Highland, Mich. Cylinders 104 and 106 are typically of ½ inch to 1" bore, with cylinder 104 having about a 2" stroke and cylinder 106 having about a 6" stroke. Cylinders manufactured by Airoyal Mfg. Co, Fairfield, N.J. as Model HP331 are satisfactory for this purpose.

Electric solenoid 146 is activated by the closure of limit switch 117. This switch becomes energized when selector switch 124 is in the "automatic" position. Electric solenoid 146 may also be energized by setting the selector switch 124 into the "manual" position, and depressing push button 128. Electric solenoid 150 is activated by limit switch 132 when the selector switch 124 is in the "automatic" position, or by push button 126 when the selector switch 124 is in the "manual" position. Electric solenoid 160 is activated by limit switch 117 when the selector switch 124 is in the "automatic" position. Counter 122 is activated either by closure of limit switch 117 when switch 124 is in the "automatic" position or by depressing push button 128 when the selector switch 124 is in the "manual" position.

Electromagnet 116 is activated whenever cylinder rod 108 is retracting or retracted so as to apply electromagnetic force to hold saw blade 60 in a nonmovable position during the grinding operation. The activation signed for electromagnet 116 may be derived from limit switch 117, or any other convenient point. In the preferred embodiment electromagnet 116 is manufactured by Magnetool Inc. of Troy, Mich. as Part No. EM-R2, and is activated by a pressure sensitive switch in air/oil tank 138, the pressure sensitive switch being manufactured by Wilkerson Corp., Englewood, Colo., as Model X07-01-000. For convenience in the drawings, electromagnet 116 is shown as being activated by pressure switch 152 in series with a battery 153.

Counter 122 is an electromechanical device having a thumbwheel for mechanically setting a count value, and an electrical input for decreasing the preset count value by one count each time a signal is applied. When the count value is equal to zero, a switch circuit 123 is completed, which is used to energize the switches described hereinbefore in "automatic" operation. A counter designated as Model P1063 and manufactured by Redington Counters, Inc., Windsor, Conn. is suitable for this purpose.

In operation, whenever switch 124 is in the "automatic" mode of operation and a preset count is set into counter 122, the operation proceeds as follows. Assuming cylinder rods 108 and 102 are initially in the fully retracted position, limit switch 130 is closed. This causes valve 144 to toggle, and pressure is applied to extend rod 108 from cylinder 106. When rod 108 begins forward travel finger 115 is directed against the saw blade to incrementally rotate the saw blade into the next grinding position. Limit switch 117 becomes actuated, thereby toggling valve 148 to apply pressure to extend rod 102 in cylinder 104. Limit switch 130 thereby becomes deactivated and valve 144 toggles, to apply pressure to cylinder 106 to retract rod 108. The pressure applied to cylinder 106 continues until rod 108 is fully retracted. In the meantime, rod 102 extends to bring carriage 20 forward and grinding wheel 54 into contact with the saw blade. At a preset distance, limit switch 132 becomes actuated and valve 148 is toggled to reverse the pressure in cylinder 104, thereby retracting rod 102. At its fully retracted position rod 102 again actuates limit switch 130 and the cycle repeats.

Each time limit switch 117 is actuated, counter 122 becomes energized and the count value decreases by one. When the count value becomes reduced to zero, counter 122 causes switch 123 to open, thereby deenergizing all of the switches and stopping the automatic grinding operation.

In the "manual" mode of operation pushbutton 128 may be depressed to toggle value 148 to cause rod 102 to extend from cylinder 104. Pushbutton 126 may be depressed to toggle valve 148 to cause rod 102 to retract into cylinder 104.

As a preliminary operational step it is necessary to position the respective cylinders for subsequent automatic operation. A saw blade 60 is placed on top and face grinding attachment 58, and is locked into centered position by centering stud 56. Sleeve 109 and arm 112 are adjusted to a position such that index finger 115 just positions a saw blade tooth in line with grinding wheel 54 at the full extension of rod 108. This may be accomplished in "manual" operation by means of pushbuttons 128 and 126. When this preliminary step has been completed, it is necessary to position the stroke of rod 102, which is done by means of stop adjustment screw 31 in combination with adjusting bracket 101. Screw 31 is set to activate limit switch 132 at the forwardmost position of grinding wheel 54, aligned along the inside edge of a sawtooth face. Bracket 101 is adjusted to provide a minimum clearance between grinding wheel 54 and saw blade 60 in the rod 102 retracted position. It should be noted that whenever electric solenoid 146 is energized electromagnet 116 is also energized. Electromagnet 116 applies a force against saw blade 60 to hold saw blade 60 in a relatively fixed position during grinding operations. Electromagnet 116 becomes deenergized during the time when index finger 115 is turning saw blade 60 on top and face grinding attachment 58.

During the initial set up procedure the stroke of cylinder 106 and rod 108 can be adjusted to cause index finger 115 to turn saw blade 60 more than one tooth position. This may be desirable when sharpening certain saws having unequal tooth sizes. The degree of rotation desired for saw blade 60 requires only that cylinder 106 be tightened into an appropriate position by lockscrew 111.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for automatically grinding circular saw blades, comprising
   (a) a table
   (b) a pedestal attached to said table for holding said saw blade in horizontal position;
   (c) a carriage assembly including a saw grinding wheel, said assembly attached to said table and movably slideable to bring said grinding wheel in and out of grinding contact with said saw blade;
   (d) an electromagnet positioned to contact said saw blade
   (e) first linear motion means connected between said table and said carriage assembly for movably sliding said carriage assembly;
   (f) second linear motion means connected between said table and said saw blade for incrementally rotating said saw blade on said pedestal;
   (g) a first limit switch for detecting a predetermined motion of said second linear motion means, and thereby activating said first linear motion means and simultaneously energizing said electromagnet;
   (h) a second limit switch for detecting a predetermined motion of said first linear motion means, and thereby activating said second linear motion means and simultaneously deenergizing said electromagnet; and
   (i) means for disabling said first and second linear motion means after a predetermined number of activations of each.

2. The apparatus of claim 1, wherein said means for disabling further comprises a counter having presetting count means for selecting a count value, and means for sensing activation of said second linear motion means and incrementing a count thereby, and switch means for signaling when said incremental count equals said preset count.

3. The apparatus of claim 1, wherein said first linear motion means further comprises a cylinder with extensible and retractable piston and rod, said rod being mechanically coupled to said carriage assembly.

4. The apparatus of claim 3, wherein said second linear motion means further comprises a cylinder with extensible and retractable piston and rod, said rod being mechanically coupled to said saw blade.

5. The apparatus of claim 4, wherein said second linear motion means mechanical coupling to said saw blade further comprises a lever connected to said rod and pivotal about said pedestal; an arm attached to said lever and adjustable for contacting against a tooth on said saw blade.

6. The apparatus of claim 5, further comprising air valves for actuating said first and second linear motion means, said air valves being controllable by respective electric solenoids.

7. The apparatus of claim 6, further comprising means for selectively energizing said electric solenoids.

8. The apparatus of claim 3, wherein said first linear motion means further comprises a shaft having a first crank affixed thereto and coupled to said rod, and a second crank affixed to said shaft and connected to said carriage assembly.

9. The apparatus of claim 8, further comprising a stop lever clamped to said shaft, said stop lever being positionable to actuate an electric switch.

10. The apparatus of claim 9, wherein said electric switch is connected to means for retracting said piston and rod in said first linear motion means.

11. In a saw grinding machine of the type for sharpening circular saw blades by manually positioning a carriage assembly having thereon a grinding wheel, and manually incrementally rotating said saw blade for sharpening a plurality of saw teeth, the improvement by way of converting said machine to automatic operation, by the addition of only two linear motion devices, comprising:
   (a) a first linear motion device for automatically reciprocating said carriage assembly between a first and second limit position;
   (b) a second linear motion device for incrementally rotating said saw blade by a predetermined angular position;
   (c) electromagnet means for contacting said saw blade;
   (d) first control means responsive to said carriage assembly first limit position to actuate said second linear motion device for incrementally rotating said saw blade and to simultaneously deenergize said electromagnet means; and
   (e) second control means responsive to the predetermined angular position of said second linear motion device for incrementally rotating for actuating said first linear motion device for automatically reciprocating said carriage assembly and simultaneously energizing said electromagnet means.

12. The apparatus of claim 11, further comprising third control means responsive to said second control means for counting a predetermined number of actuations of said second control means.

13. The apparatus of claim 12, wherein said third control means further comprises means for presetting a count value and means for disabling said means for reciprocating and said means for incrementally rotating when said number of counted actuations equals said preset count.

14. The apparatus of claim 11, wherein said first linear motion device further comprises a hydraulic cylinder and piston having a piston rod coupled to said carriage assembly, and limit switches actuable by said rod position.

15. The apparatus of claim 14, further comprising means for adjusting the actuation positions of said limit switches.

16. The apparatus of claim 15, further comprising enclosed hydraulic oil reservoirs coupled to said cylinder, said reservoirs having air inlets.

17. The apparatus of claim 16, further comprising an air valve coupled to said air inlets, said air valve being capable of selective coupling to atmospheric pressure and to an air pressure in the range of 50–150 p.s.i.

18. The apparatus of claim 17, further comprising means for selectively positioning said air valve, connected to one of said limit switches.

19. The apparatus of claim 11, wherein said second linear motion device further comprises a hydraulic cylinder and piston having a piston rod coupled to said saw blade.

20. The apparatus of claim 19, further comprising a pivotable lever connected to said piston rod, said lever pivotable about a vertical axis; an arm attached to said lever and extending to a contact position against one of said saw blade teeth.

21. The apparatus of claim 20, further comprising a limit switch actuable by said piston rod at a predetermined extensible position.

22. The apparatus of claim 21, further comprising enclosed hydraulic reservoirs coupled to said cylinder, said reservoirs having air inlets.

23. The apparatus of claim 22, further comprising an air valve coupled to said air inlets, said air valve being capable of selective coupling to atmospheric air pressure and to an air pressure in the range of 50–150 p.s.i.

24. The apparatus of claim 23, further comprising means for selectively positioning said air valve, connected to said first linear motion device.

* * * * *